(12) United States Patent
Carlson et al.

(10) Patent No.: US 6,173,228 B1
(45) Date of Patent: Jan. 9, 2001

(54) METHOD AND APPARATUS FOR CONTROLLING A TRANSMISSION ASSOCIATED WITH A NEUTRALIZE MODE

(75) Inventors: Robert D. Carlson, Plainfield; Randy R. Hayward, Mapleton, both of IL (US); Laurence M. Rubin, Raleigh, NC (US); Steven T. Ufheil, East Peoria, IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/127,487

(22) Filed: Jul. 31, 1998

(51) Int. Cl.[7] .................................................. B60K 41/24
(52) U.S. Cl. .......................... 701/51; 701/50; 192/220.1
(58) Field of Search ................................. 701/50, 51, 48, 701/53, 67, 95; 303/191; 477/92; 192/220, 220.1

(56) References Cited

U.S. PATENT DOCUMENTS

| | | | |
|---|---|---|---|
| 3,181,667 | * 5/1965 | Lohbauer et al. | 192/220.1 |
| 3,999,641 | * 12/1976 | Luttrell | 192/220.1 |
| 4,227,598 | 10/1980 | Luft | 192/220.1 |
| 4,530,427 | * 7/1985 | Skeel | 192/220.1 |
| 4,966,262 | 10/1990 | Mieczkowski | 192/220.2 |
| 5,052,531 | 10/1991 | Bota | 192/219.1 |
| 5,489,007 | 2/1996 | Yesel | 180/243 |
| 5,636,120 | 6/1997 | Yesel et al. | 701/51 |

FOREIGN PATENT DOCUMENTS

| | | |
|---|---|---|
| 0004439A1 | 10/1979 | (EP) . |
| 00040647A1 | 12/1981 | (EP) . |
| 08004894 | 1/1996 | (EP) . |
| 97/33782 | 9/1997 | (WO) . |

\* cited by examiner

*Primary Examiner*—William A. Cuchlinski, Jr.
*Assistant Examiner*—Eric M. Gibson
(74) *Attorney, Agent, or Firm*—Byron G. Buck

(57) ABSTRACT

A method and apparatus for controllably engaging, or disengaging, or both engaging and disengaging, a neutralize mode associated with a transmission located on a machine is disclosed. The machine has a controller, a memory associated with the controller, and a braking system. A determined system brake pressure is compared with at least one of an established neutralize pressure value and in gear pressure value. The neutralize mode is engaged or disengaged in response to the comparison.

33 Claims, 3 Drawing Sheets

Fig_1_

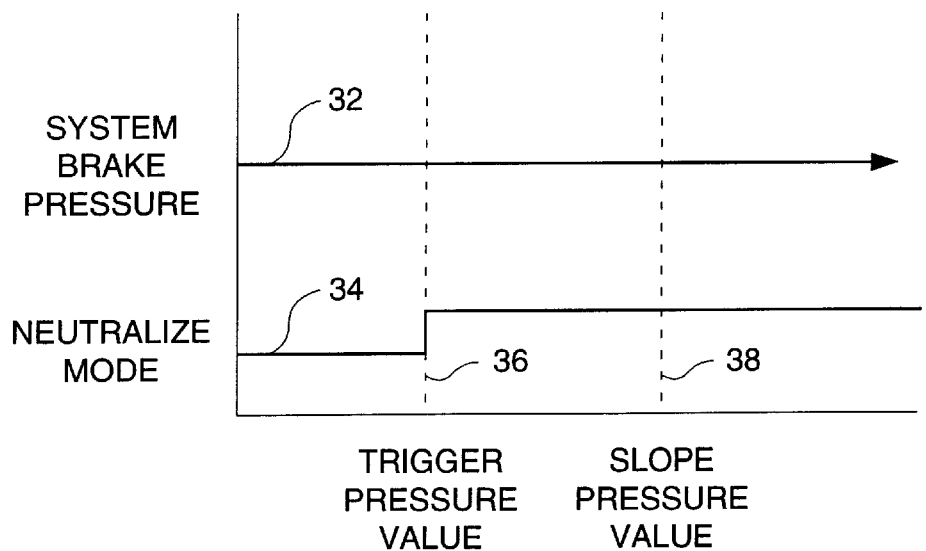
Fig-3a-
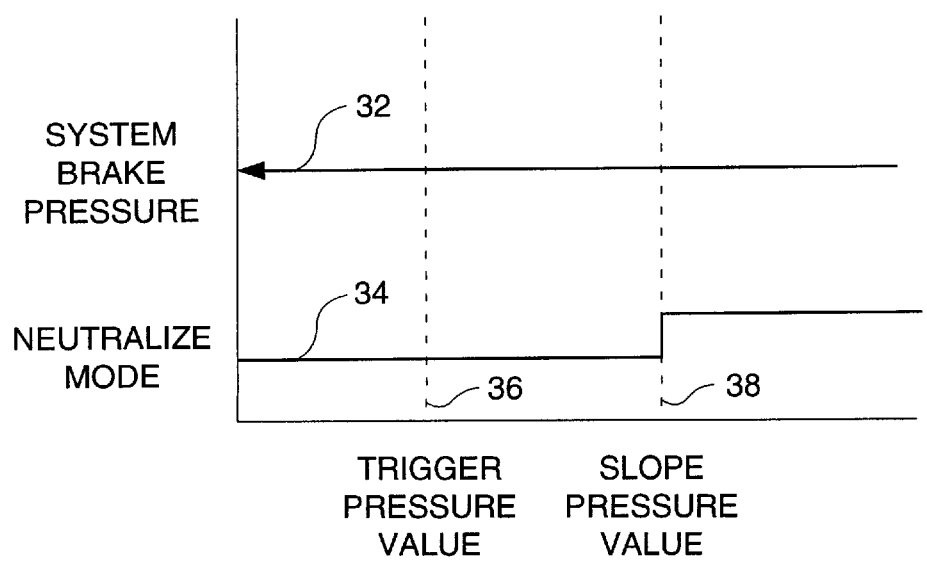
Fig-3b-

METHOD AND APPARATUS FOR CONTROLLING A TRANSMISSION ASSOCIATED WITH A NEUTRALIZE MODE

TECHNICAL FIELD

This invention relates to a machine having an electronically controlled transmission, and more particularly, to a method and apparatus for controllably engaging, and disengaging, a neutralize mode associated with the transmission.

BACKGROUND ART

Often, in machines, such as small wheel loaders, a neutralize function enables the transmission to be shifted to neutral when the service brakes are applied. In prior systems, the neutralize function typically utilizes an on/off limit switch. The limit switch is usually located beneath a service brake pedal. As the service brake pedal is depressed, the travel limit for the limit switch is reached, inducing the limit switch contacts to close. The closed state of the limit switch contacts is communicated to an electronic controller associated with the machine, and a signal for brake actuation is subsequently produced.

A problem with this form of engaging and disengaging a neutralize function is the nonspecific amount of brake pedal travel that may occur prior to the brakes being applied. As a result of the nonspecific amount of brake pedal travel, the transmission may be neutralized at an undesirable time. If, the transmission is neutralized later than desirable, premature wear on the break pads may occur due to the service brakes being applied prior to the transmission being placed in neutral. Also, excessive wear on the service brakes occurs if the transmission is neutralized sooner than desirable.

Also, due to wear of mechanical parts and lack of proper maintenance, the brake pedal travel distance may alter. If, the brake pedal travel distance alters, the enabling time of the neutralize function could alter.

The present invention is directed to overcoming one or more of the problems as set forth above.

DISCLOSURE OF THE INVENTION

In one aspect of the present invention, a method of controlling a transmission included in a machine is disclosed. The machine has a controller and a brake system. A neutralize pressure value is established, and a system brake pressure associated with the brake system is determined. A comparison is made between the system brake pressure and the neutralize pressure value, and a neutralize mode associated with the transmission is responsively engaged.

In another aspect of the present invention, a method of controlling a transmission included in a machine is disclosed. The machine has a controller and a brake system. A in gear pressure value is established, and a system brake pressure associated with the brake system is determined. A comparison is made between the system brake pressure and the in gear pressure value, and a neutralize mode associated with the transmission is responsively disengaged.

In a third aspect of the present invention, a machine having a controllable transmission, is disclosed. The machine has a brake system. Associated with the machine is a controller configured to communicate with the transmission and the brake system. A neutralize pressure value is stored in a memory device, associated with the controller. Also, associated with the brake system is a pressure sensor configured to sense a system brake pressure. A neutralize mode, associated with the transmission, is configured to be controllably engaged.

In a fourth aspect of the present invention, a machine having a controllable transmission, is disclosed. The machine has a brake system. Associated with the machine is a controller configured to communicate with the transmission and the brake system. A in gear pressure value is stored in a memory device, associated with the controller. Also, associated with the brake system is a pressure sensor configured to sense a system brake pressure. A neutralize mode, associated with the transmission, is configured to be controllably disengaged.

In a fifth aspect of the present invention, a system for controlling a transmission on a machine is disclosed. A brake system is located in the machine. Associated with the machine is a controller configured to communicate with the transmission and the brake system. A memory device, associated with the controller, stores a neutralize pressure value. Also, associated with the brake system is a pressure sensor configured to sense a system brake pressure. A neutralize mode is configured to be engaged in response to a comparison of the system brake pressure and the neutralize pressure value.

In a sixth aspect of the present invention, a system for controlling a transmission on a machine is disclosed. A brake system is located in the machine. Associated with the machine is a controller configured to communicate with the transmission and the brake system. A memory device, associated with the controller, stores a in gear pressure value. Also, associated with the brake system is a pressure sensor configured to sense a system brake pressure. A neutralize mode is configured to be disengaged in response to a comparison of the system brake pressure and the neutralize pressure value.

These and other aspects and advantages of the present invention, as defined by the appended claims, will be apparent to those skilled in the art from reading the following specification in conjunction with the drawings and the claims.

BRIEF DESCRIPTION OF THE DRAWINGS

For a better understanding of the invention, reference may be made to the accompanying drawings, in which:

FIGS. 3A–3B are a diagram depicting at least one of an increase and decrease in a system brake pressure of the machine of FIG. 1.

BEST MODE FOR CARRYING OUT THE INVENTION

The present invention provides a method and an apparatus for controlling a transmission by controllably engaging, and disengaging a neutralize mode associated with the transmission. The application of the neutralize mode, in the preferred embodiment, is dependent on a comparison of a system brake pressure with at least one predetermined pressure value. The following description uses a small wheel loader as an example only. This invention can be applied to other types of earth moving machines, such as backhoe loaders.

Figure 1:
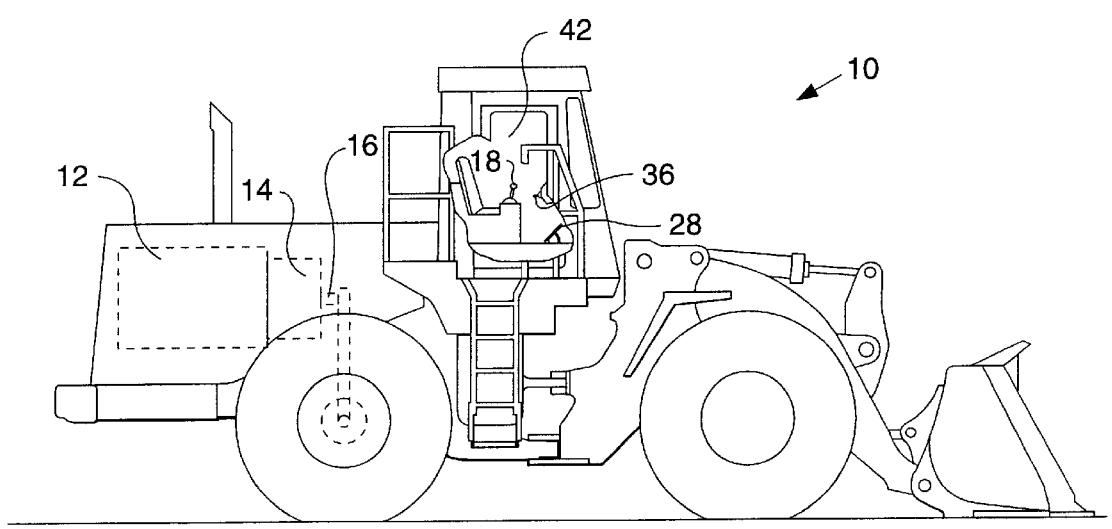
FIG. 1 is a diagrammatic side elevational view of a preferred embodiment of a machine constructed for operation in accordance with the present invention.
Figure 2:
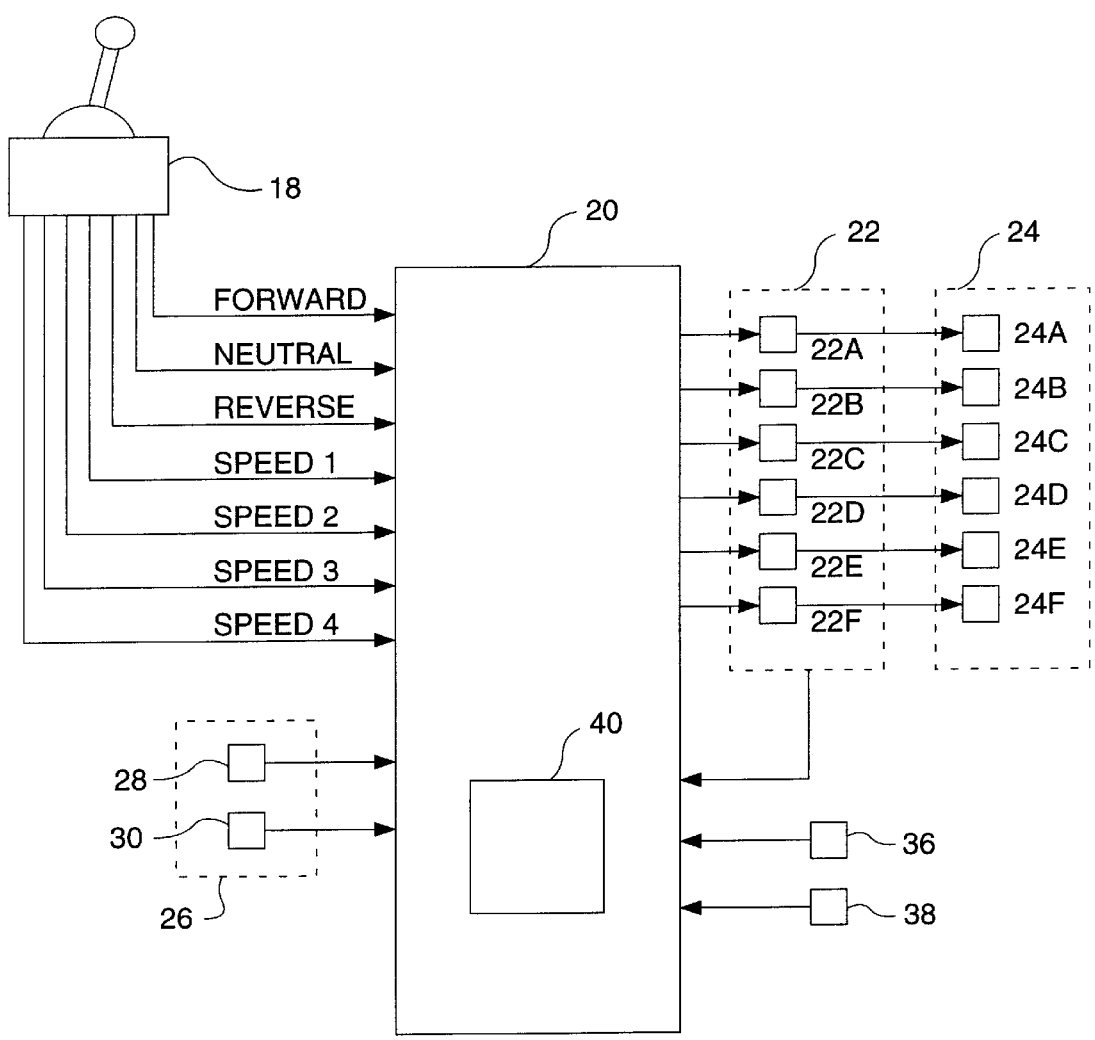
FIG. 2 is a schematic block diagram of the transmission controller of the machine of FIG. 1.

Referring to FIGS. 1–2, a preferred embodiment of a machine such as a wheel loader 10, having an engine 12 with a transmission 14 coupled to the engine 12, is shown. The transmission 14 is operatively connected to the wheels on the machine 10 in a manner well known to one skilled in the art. The transmission output may be measured in terms of the speed of rotation of the transmission output shaft 16 in revolutions per minute (RPM). A shift control lever 18, associated with the transmission 14 is for shifting the transmission 14 between its various gears, includes at least one of a neutral gear, a direction gear, and a speed gear.

Preferably the shift control lever 18 is a multi-contact switch that sends position information to a controller 20 to indicate a desired gear for the transmission 14. When the transmission speed and the engine speed permit a shift to the desired gear, the controller 20 operates the appropriate transmission solenoids 22. The controller 20 used in the preferred embodiment is a Motorola microcontroller, Model No. 68HC11. However, many suitable controllers including analog and/or digital circuitry may be used in connection with the present invention, as would be known to one skilled in the art.

In a preferred embodiment, six transmission solenoids, three relating to direction and three relating to speed, are used and are illustrated and labeled 22A through 22F. As is known in the art, the transmission solenoids 22 operate a plurality of corresponding transmission clutches 24 and thereby determine the actual gear of the transmission 14. For each transmission solenoid 22A–22F there is a corresponding transmission clutch 24. The three direction clutches are illustrated and labeled 24A through 24C, and the three speed clutches are illustrated and labeled 24D through 24F. The controller 20 actuates appropriate ones of the solenoids 22A–22F for shifting the transmission 14 to the desired gear.

The foregoing description uses six transmission solenoids 22 and six corresponding transmission clutches 24 as an example only. This invention can readily be implemented in connection with transmissions having less than, or more than, six solenoids and six corresponding clutches.

The machine 10 is controllably slowed down or stopped by a brake system 26 located on the machine 10. Advantageously, at least one service brake 28 and at least one brake pressure sensor 30 is included in the brake system 26. The brake pressure sensor 30 is preferably configured to monitor the fluid pressure in the brake system 26, and communicate the system brake pressure 32 with the controller 20.

A neutralize mode 34 is a state where the direction clutch 24A–24C is disabled and the transmission is in neutral, while the speed clutch 24D–24F remains enabled. A neutralize pressure value 36 is a predetermined value. The neutralize pressure value 36 advantageously represents a point just before excessive force will be placed on the service brakes 28 prior to the neutralize mode 34 being engaged. A in gear pressure value 38 is a predetermined value. The in gear pressure value 38 advantageously represents a point just before the machine could roll down a slope prior to re-engaging the transmission 14. A memory device 40, associated with the controller 20, is configured to store the neutralize pressure value 36 and the in gear pressure value 38.

In the preferred embodiment, the neutralize pressure value 36 and the in gear pressure value 38, are values that are provided to the controller 20 during the manufacturing process by an electronic service tool, or by an operator input device, such as an electronic keypad accessible to the operator. However, one skilled in the art could readily implement the present invention in connection with at least one of the neutralize pressure value 36 and the in gear pressure value 38 being determined by the controller 20. The controller 20 may determine at least one of the neutralize pressure value 36 and the in gear pressure value 38 from various inputs. One example being, the slope of the incline indicated by an inclination indicator (not shown), and the force created by the mass of the machine 10, may be inputs used by the controller 20 to determine at least one of the neutralize pressure value 36 and the in gear pressure value 38.

In the preferred embodiment, the service brake 28 is maintained in the engaged position by the application of fluid pressure, and spring-biased in the disengaged position. Alternatively, the service brake 28 may also be spring-biased in the engaged position, and maintained in the disengaged position by application of fluid pressure. Many suitable types of service brakes may be used in connection with the present invention as would be known to one skilled in the art.

Referring to FIG. 3A, a diagram depicting an increase in the system brake pressure 32 of a preferred embodiment of the machine 10, is shown. When the system brake pressure 32 is less than the neutralize pressure value 36, the direction clutches 24A–24C and the speed clutches 24D–24F are enabled, and the service brake 28 is not engaged. The position of the shift control lever 18 determines which gear the transmission is placed in when the system brake pressure 32 is less than the neutralize pressure value 36.

If, the system brake pressure 32 increases to a value equal to or greater than the neutralize pressure value 36 and less than the in gear pressure value 38, the neutralize mode 34 is engaged, whereby the direction clutch 24A–24C is disabled and the transmission is in neutral. If, the system brake pressure 32 continues to increase to a value equal to or greater than the in gear pressure value 38, the transmission 14 will remain in the neutralize mode 34.

Referring to FIG. 3B, a diagram depicting a decrease in the system brake pressure 32 of a preferred embodiment of the machine 10, is shown. In the preferred embodiment, while the system brake pressure 32 has a value greater than the in gear pressure value 38, the transmission will remain in the neutralize mode 34. When the system brake pressure is decreasing, the value for the in gear pressure value 38 may be equal to, or greater than, or less then, the value used for the in gear pressure value 38 when the system brake pressure was increasing.

When the system brake pressure 32 decreases to a value equal to or less than the in gear pressure value 38 the neutralize mode 34 is disengaged. The service brake 28 is disengaged and the direction clutches 24A–24C are enabled when the neutralize mode 34 is disengaged. The neutralize mode 34 will remain disengaged as long as the system brake pressure 32 continues to have a value less then the in gear pressure value 38. However, if the system brake pressure 32 first decreases to a value less than the neutralize pressure value 36, and subsequently the system brake pressure 32 increases to a value equal to or greater than the neutralize pressure value 36, the neutralize mode 34 will be engaged, as shown in the increasing brake pressure diagram in FIG. 3A.

Referring again to FIGS. 1–2, various operator controls are located in an operator's compartment 42. These controls include the shift control lever 18, the service brake 28 and a neutralize mode override switch 44 configured to nullify the neutralize mode 34. When the neutralize mode 34 is nullified the machine 10 will remain in gear regardless of the system brake pressure 32.

Industrial Applicability

A method and apparatus for controllably engaging and disengaging a neutralize mode associated with the transmission located on a machine is disclosed. The present invention reduces premature wear on the service brakes due to the neutralize mode being engaged later than desirable. Using the system brake pressure to determine when the neutralize mode is engaged, results in the transmission being placed in neutral prior to the application of the service brakes. Additionally, excessive wear on the service brakes due to the transmission being neutralized sooner than desirable is reduced. Also, the method and apparatus for controllably engaging and disengaging the neutralize mode adapts to changes on the machine as mechanical parts wear.

Other aspects, objects and advantages of the present invention can be obtained from a study of the drawings, the disclosure and the appended claims.

What is claimed is:

1. A method of controlling a transmission included in a machine, the machine having a controller and a brake system, including the steps of:
    establishing a neutralize pressure value;
    determining a system brake pressure associated with the brake system;
    comparing the system brake pressure to the neutralize pressure value; and
    engaging the neutralize mode in response to said comparison of the system brake pressure to the neutralize pressure value.

2. A method as set forth in claim 1, including the steps of:
    establishing a in gear pressure value;
    comparing the system brake pressure to the in gear pressure value; and
    disengaging the neutralize mode in response to said comparison of the system brake pressure to the in gear pressure value.

3. A method as set forth in claim 1, the transmission having at least one direction clutch, and including the step of disengaging the at least one direction clutch in response to engaging the neutralize mode.

4. A method as set forth in claim 2, the transmission having at least one direction clutch and including the step of engaging the at least one direction clutch in response to disengaging the neutralize mode.

5. A method as set forth in claim 1, including the step of utilizing an operator interface configured to communicate the neutralize pressure value with the controller.

6. A method as set forth in claim 2, including the step of utilizing an operator interface configured to communicate the in gear pressure value with the controller.

7. A method as set forth in claim 1, including the step of selectively utilize a neutralize mode override switch associated with the neutralize mode, the neutralize mode override switch being configured to disable the neutralize mode.

8. A method of controlling a transmission included in a machine, the machine having a controller and a brake system, including the steps of:
    establishing a in gear pressure value;
    determining a system brake pressure associated with the brake system;
    comparing the system brake pressure to the in gear pressure value; and
    disengaging the neutralize mode in response to said comparison of the system brake pressure to the in gear pressure value.

9. A method as set forth in claim 8, the transmission having at least one direction clutch, and including the step of, engaging the at least one direction clutch in response to disengaging the neutralize mode.

10. A method as set forth in claim 8, including the step of utilizing an operator interface to communicate the in gear pressure value with the controller.

11. A method as set forth in claim 8, including the step of selectively utilizing a neutralize mode override switch associated with the neutralize mode, the neutralize mode override switch being configured to disable the neutralize mode.

12. A machine having a controllable transmission, comprising:
    a brake system associated with the machine;
    a controller associated with the machine, the controller being configured to communicate with the transmission and the brake system;
    a memory device associated with the controller;
    a neutralize pressure value stored in the memory device;
    a pressure sensor associated with the brake system, the pressure sensor configured to sense a system brake pressure; and
    a neutralize mode associated with the transmission, the neutralize mode being configured to controllably engage in response to a comparison of the system brake pressure and the neutralize pressure value.

13. A machine having a controllable transmission as set forth in claim 12, further comprising a in gear pressure value stored in the memory device, the neutralize mode being configured to controllably disengage in response to a comparison of the system brake pressure and the in gear pressure value.

14. A machine having a controllable transmission as set forth in claim 12, further comprising at lest one direction clutch associated with the transmission, the at least one direction clutch being configured to controllably disengage in response to the neutralize mode.

15. A machine having a controllable transmission as set forth in claim 13, further comprising at least one direction clutch associated with the transmission, the at least one direction clutch configured to controllably engage in response to the neutralize mode.

16. A machine having a controllable transmission as set forth in claim 12, further comprising an operator interface configured to communicate the neutralize pressure value with the controller.

17. A machine having a controllable transmission as set forth in claim 13, further comprising an operator interface configured to communicate the in gear pressure value with the controller.

18. A machine having a controllable transmission as set forth in claim 12, further comprising a neutralize mode override switch associated with the neutralize mode, the neutralize mode override switch being configured to disable the neutralize mode.

19. A machine having a controllable transmission, comprising:
    a brake system associated with the machine;
    a controller associated with the machine, the controller being configured to communicate with the transmission and the brake system;
    a memory device associated with the controller;
    a in gear pressure value stored in the memory device;
    a pressure sensor associated with the brake system, the pressure sensor configured to sense a system brake pressure; and a neutralize mode associated with the transmission, the neutralize mode being configured to controllably disengage in response to a comparison of the system brake pressure and the in gear pressure value.

20. A machine having a controllable transmission as set forth in claim 19, further comprising at least one direction clutch associated with the transmission, the at least one direction clutch configured to controllably engage in response to the neutralize mode.

21. A machine having a controllable transmission as set forth in claim 19, further comprising an operator interface configured to communicate the in gear pressure value with the controller.

22. A machine having a controllable transmission as set forth in claim 19, further comprising a neutralize mode override switch associated with the neutralize mode, the neutralize mode override switch being configured to disable the neutralize mode.

23. A system for controlling a transmission on a machine, comprising:
   a brake system located in the machine;
   a controller configured to communicate with the transmission and the brake system;
   a memory device associated with the controller;
   a neutralize pressure value stored in the memory device;
   a pressure sensor associated with the brake system configured to sense a system brake pressure and communicate the system brake pressure with the controller; and
   a neutralize mode associated with the transmission, the neutralize mode being configured to controllably engage in response to a comparison of the system brake pressure and the neutralize pressure value.

24. A system for controlling a transmission on a machine as set forth in claim 23, further comprising a in gear pressure value stored in the memory device, and the neutralize mode being configured to disengaged in response to a comparison of the system brake pressure and the in gear pressure value.

25. A system for controlling a transmission on a machine as set forth in claim 23, further comprising at least one direction clutch associated with the transmission, the at least one direction clutch being configured to controllably disengage in response to the neutralize mode.

26. A machine having a controllable transmission as set forth in claim 24, further comprising at least one direction clutch associated with the transmission, the at least one direction clutch being configured to controllably engage in response to the neutralize mode.

27. A system for controlling a transmission on a machine as set forth in claim 23, further comprising an operator interface configured to communicate the neutralize pressure value with the controller.

28. A system for controlling a transmission on a machine as set forth in claim 24, further comprising an operator interface configured to communicate the in gear pressure value with the controller.

29. A machine having a controllable transmission as set forth in claim 23, further comprising a neutralize mode override switch associated with the neutralize mode, the neutralize mode override switch being configured to disable the neutralize mode.

30. A system for controlling a transmission on a machine, comprising:
   a brake system located in the machine;
   a controller configured to communicate with the transmission and the brake system;
   a memory device associated with the controller;
   a in gear pressure value stored in the memory device;
   a pressure sensor associated with the brake system configured to sense a system brake pressure and communicate the system brake pressure with the controller; and
   a neutralize mode associated with the transmission, the neutralize mode being configured to controllably disengage in response to a comparison of the system brake pressure and the in gear pressure value.

31. A system for controlling a transmission on a machine as set forth in claim 30, further comprising at least one direction clutch associated with the transmission, the at least one direction clutch being configured to controllably engage in response to the neutralize mode.

32. A system for controlling a transmission on a machine as set forth in claim 30, further comprising an operator interface configured to communicate the in gear pressure value with the controller.

33. A machine having a controllable transmission as set forth in claim 30, further comprising a neutralize mode override switch associated with the neutralize mode, the neutralize mode override switch configured to disable the neutralize mode.

* * * * *